United States Patent
Jung et al.

(10) Patent No.: US 6,421,735 B1
(45) Date of Patent: Jul. 16, 2002

(54) APPARATUS AND METHOD FOR AUTOMATICALLY SELECTING A NETWORK PORT FOR A HOME NETWORK STATION

(75) Inventors: Kyongsoo Michael Jung; Philip J. Keller, both of Fremont; Paul K. Jung, Foster City, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/182,669

(22) Filed: Oct. 30, 1998

(51) Int. Cl.$^7$ .............................................. G06F 15/16
(52) U.S. Cl. ...................... 709/250; 709/220; 709/230
(58) Field of Search ................................. 709/250, 228, 709/230, 231, 220; 714/49; 713/300; 370/235, 438, 465

(56) References Cited

U.S. PATENT DOCUMENTS

| | | | | |
|---|---|---|---|---|
| 5,165,022 A | | 11/1992 | Erhard et al. | |
| 5,671,251 A | | 9/1997 | Blackwell et al. | |
| 5,784,573 A | * | 7/1998 | Szczepanek et al. | 709/250 |
| 5,867,662 A | * | 2/1999 | Riggs | 709/228 |
| 5,883,894 A | * | 3/1999 | Patel et al. | 370/438 |
| 5,946,462 A | * | 8/1999 | Rangan et al. | 714/49 |
| 5,991,885 A | * | 11/1999 | Chang et al. | 713/300 |
| 6,049,528 A | * | 4/2000 | Hendel et al. | 370/235 |
| 6,052,737 A | * | 4/2000 | Bitton et al. | 709/250 |
| 6,058,427 A | * | 5/2000 | Viswanath et al. | 709/231 |
| 6,215,764 B1 | * | 4/2001 | Wey et al. | 370/216 |
| 6,269,104 B1 | * | 7/2001 | McLaughlin et al. | 370/464 |
| 6,292,467 B1 | * | 9/2001 | Keller | 370/241 |

FOREIGN PATENT DOCUMENTS

WO    WO 98/30039    7/1998

* cited by examiner

Primary Examiner—Ayaz Sheikh
Assistant Examiner—Philip B. Tran (57) ABSTRACT

A physical layer transceiver of a home network station connected to a telephone medium has an architecture enabling adaptation of detection circuitry based on received network signals to enable reliable recovery of data signals. The physical layer transceiver includes an input amplifier that amplifies network signals according to one of 128 gain settings set by a receiver gain control signal. A signal conditioning circuit includes an envelope detector configured for outputting an envelope of the amplified received signal, and an energy detector configured for outputting an energy signal of the amplified received signals. The envelope signal and the energy signal are supplied to slicer threshold circuits, configured for outputting noise, peak, data event and energy event signals based on noise threshold, peak threshold, data transition threshold, and energy threshold signals, respectively. A digital controller controls the input amplifier gain and the threshold values, and adjusts the gain and threshold values based on the noise event signal and the peak event signal within an access ID (AID) interval. The physical layer transceiver of the home network station includes link detection logic enabling the physical layer transceiver to determine whether a valid link is detected on the telephone line medium. The home network station is configured for communication with the home network physical layer transceiver, as well as other physical layer transceivers, via a shared media independent interface (MII), to determine which network port to use for network communications. If none of the other physical layer transceivers indicate a valid link is present on the corresponding network medium, the home network station automatically configures the network communication software for selecting the port corresponding to the physical layer transceiver connected to the telephone line medium.

10 Claims, 5 Drawing Sheets

APPARATUS AND METHOD FOR AUTOMATICALLY SELECTING A NETWORK PORT FOR A HOME NETWORK STATION

FIELD OF THE INVENTION

The present invention relates to network interfacing, and more particularly, to methods and systems for controlling transmission of data between network stations connected to a telephone line.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

In addition, any attempt to implement a network in a home network environment may suffer from the additional disadvantage of the necessity of constantly reconfiguring the associated communication drivers in the network stations, depending upon which physical layer transceiver a user is going to use. In particular, a user may have a network station that has a 10 BASE-T PHY transceiver and a home network transceiver. Normally, the user would need to open the network configuration settings in the network station operating system software, and change the port selection manually from 10 BASE-T to home network, or vice versa. The requirement for manually reconfiguring (i.e., selecting) the network port may be a substantial annoyance for a user, especially if the user is not intimately familiar with reconfiguring driver software.

In addition, a problem arises when using two or more available network ports for different physical layer transceivers in that not all the links may be active on a particular network port. For example, a network station may be configured for receiving two or more network ports, each port configured for communicating according to a different network protocol, such as 10 BASE-T, 100 BASE-T, etc. However, a user may be unaware if a certain link is not active, for example, if the network is down at a remote end. Hence, a user may need to manually reconfigure the driver software each time the network is turned on in order to determine the optimum physical layer transceiver to use for network communications.

SUMMARY OF THE INVENTION

There is a need for a network station having a plurality of physical layer transceivers for communication on respective network media to automatically select a port for a physical layer transceiver, without user intervention.

There is also a need for a network station that can select between a physical layer transceiver port for a home network environment and other physical layer transceivers supporting respective physical layer protocols such as 10 BASE-T or 100 BASE-T.

These and other needs are attained by the present invention, where each physical layer transceiver providing communication for a corresponding network medium having a prescribed media protocol is able to determine a link status for the corresponding network medium. The network station accesses the link status for a plurality of physical layer transceivers by a shared media independent interface, and selects one of the physical layer transceivers based on the corresponding link status for communication on the corresponding network medium.

According to one aspect of the present invention, a method in a network station of establishing a connection to a network includes connecting a plurality of physical layer transceivers to physical layer media having respective media protocols, each physical layer transceiver having a corresponding physical layer address, at least one of the physical layer transceivers configured for transmitting and receiving network signals via a telephone line medium. The method also includes determining in each of the physical layer transceivers a link status for the corresponding network medium, accessing the link status for the respective physical layer transceivers via a shared media independent interface providing communications between the physical layer transceivers and the network station, and selecting one of the physical layer transceivers based on the corresponding link status for communication on the corresponding network medium. Determining the link status in each physical layer transceiver enables the network station to determine which network links, including the telephone line medium, are available for network transmission. Moreover, the selecting of one of the physical layer transceivers enables a network station to automatically configure itself for network communications, without user intervention.

According to another aspect of the present invention, a network station configured for communication on a network includes a plurality of physical layer transceivers configured for determining the link status on respective network media, at least one of the network media being a telephone line medium. The network station also includes a media access controller configured for obtaining the link status for the respective physical layer transceivers via a shared media independent interface, and a controller for selecting one of the physical layer transceivers for network communication based on the obtained link status for the respective network media.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

References made to the attached drawings, wherein elements having the same reference numeral designations represent like elements throughout and wherein.

BEST MODE FOR CARRYING OUT THE INVENTION

Figure 1:
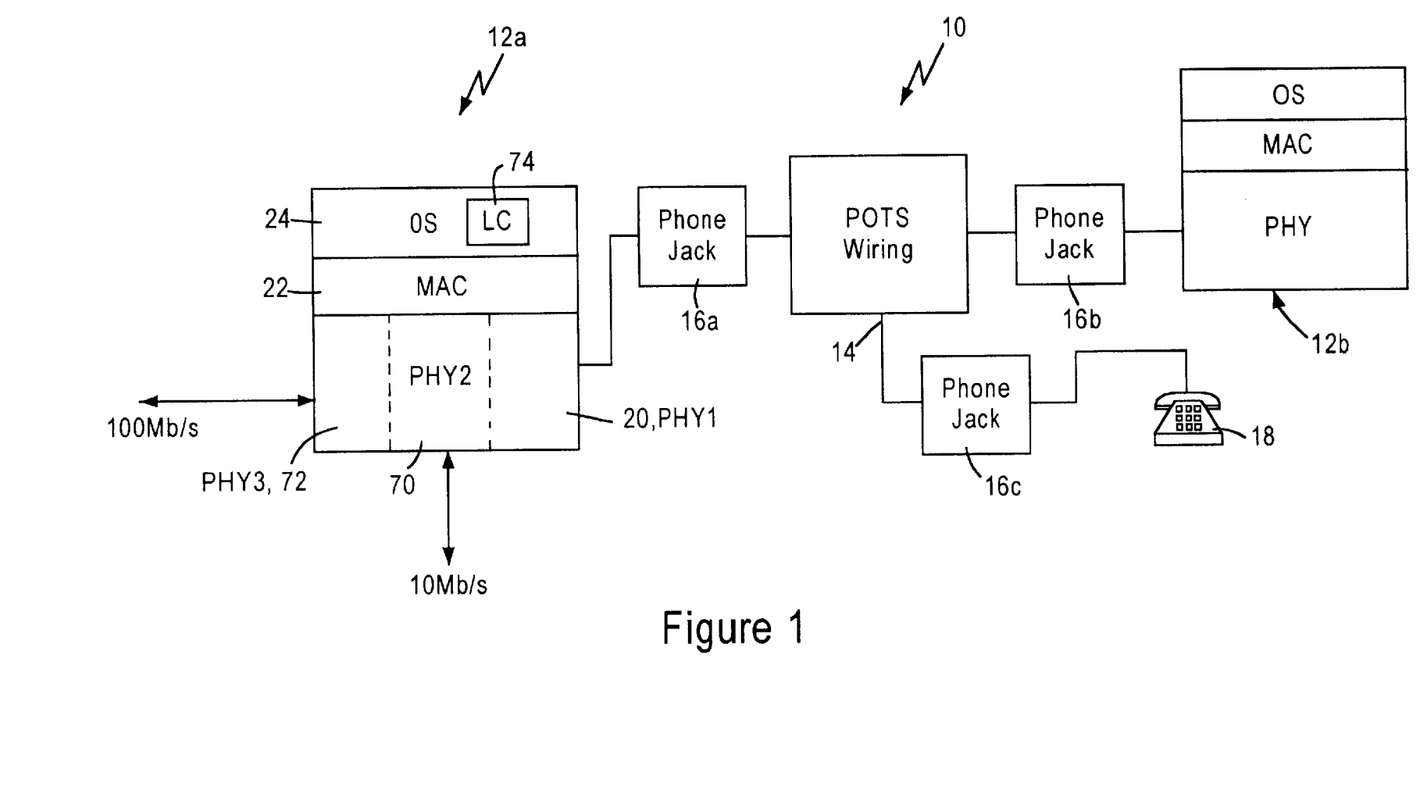
FIG. 1 is a block diagram illustrating a local area network deployed over residential twisted pair wiring.

FIG. 1 is a diagram of an Ethernet (IEEE 802.3) local area network 10 implemented in a home environment using twisted pair network media according to an embodiment of the invention. As shown in FIG. 1, the network 10 includes network stations 12a and 12b that are connected to a telephone line (twisted pair) wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
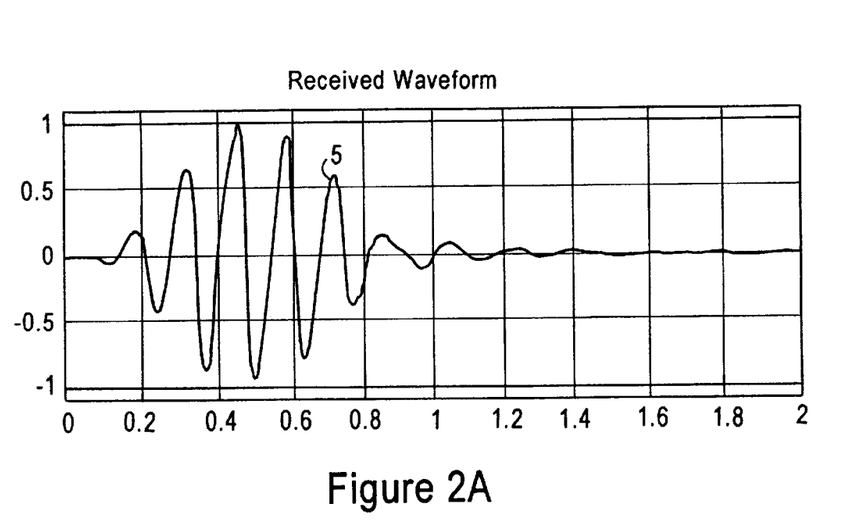
FIGS. 2A, 2B, 2C and 2D are diagrams illustrating processing of received waveforms by the physical layer transceiver of FIG. 1 according to an embodiment of the present invention.
Figure 2B:
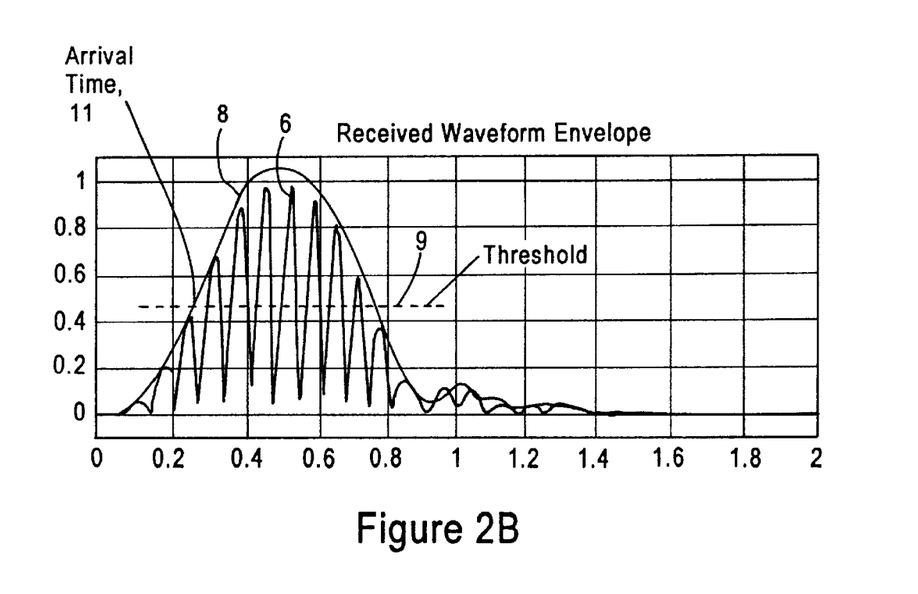

The stations 12a and 12b communicate by transmitting band limited pulses that carry network data modulated in the analog network signals. In particular, the physical layer transmitter transmits a band limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
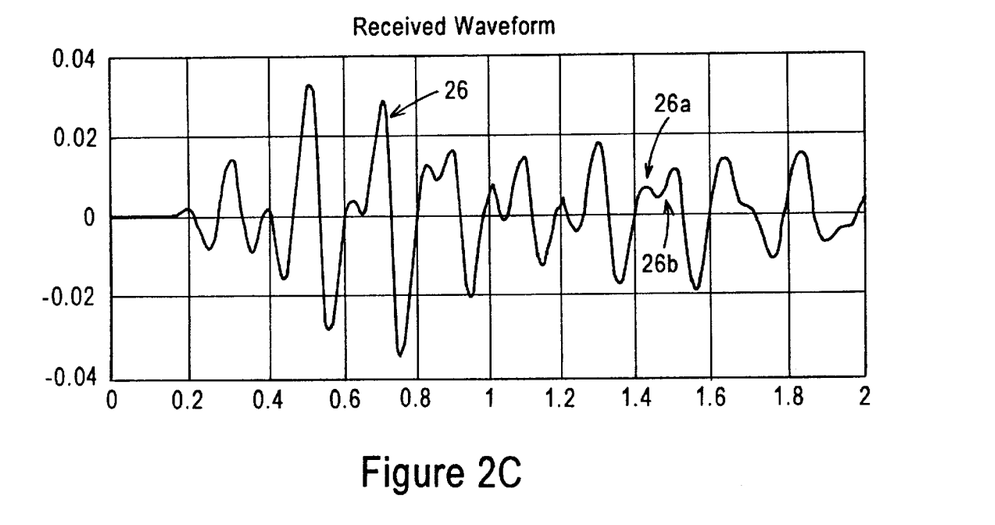
Figure 2D:
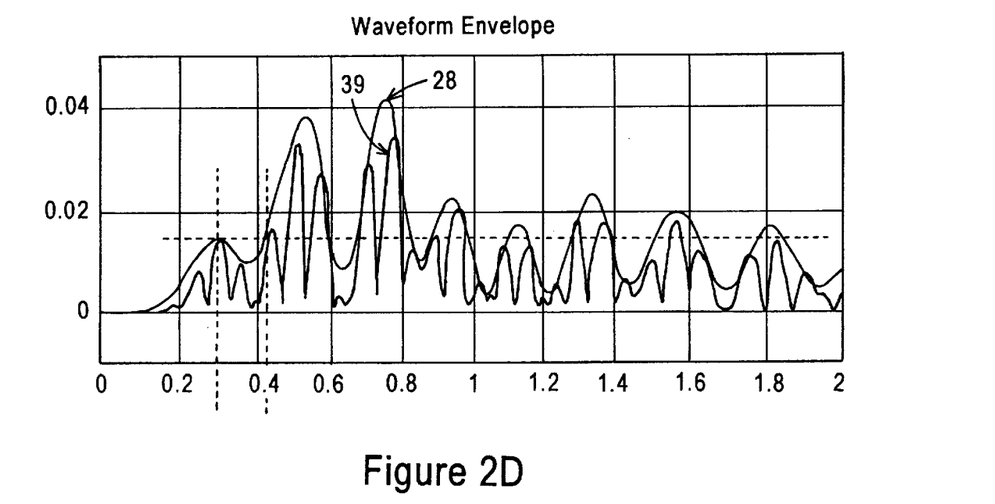

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture adaptively adjusts the signal processing circuitry on both the receive side and transmit side to optimize accurate recovery data from the transmitted network signals, and optimize transmitter performance to overcome adverse conditions due to home telephone wiring topology. In particular, the disclosed embodiment includes a link controller (LC) 74 within the network station 12, for example communication driver software within the OS layer 24 executable by the host microprocessor or logic circuitry implemented in the OS layer 24 or the MAC 22.

As described in detail below with respect to FIGS. 4 and 5, the link controller 74 within the operating system layer 24 controls the selection of a physical layer port for transmission of network data. In particular, the station 12a of FIG. 1 includes three physical layer ports, namely the physical layer transceiver 20 (PHY1) configured for transmitting and receiving network signals on the telephone line medium 14, a second physical layer 70 (PHY2) configured for sending and receiving data according to 10-BASE T protocol, and a third physical layer transceiver 72 (PHY3) configured for transmitting data according to another network protocol, for example 100-BASE T. As described below, the link controller 74 obtains the link status from the respective physical layer transceivers 20, 70 and 72, and selects one of the physical layer transceivers based on the corresponding link status for communication on the corresponding network medium. An overview of the physical layer transceiver architecture for transmitting on a telephone line medium will first be provided, following by a description of the arrangement for selecting a physical layer transceiver port for transmitting data.

Physical Layer Overview

Figure 3:
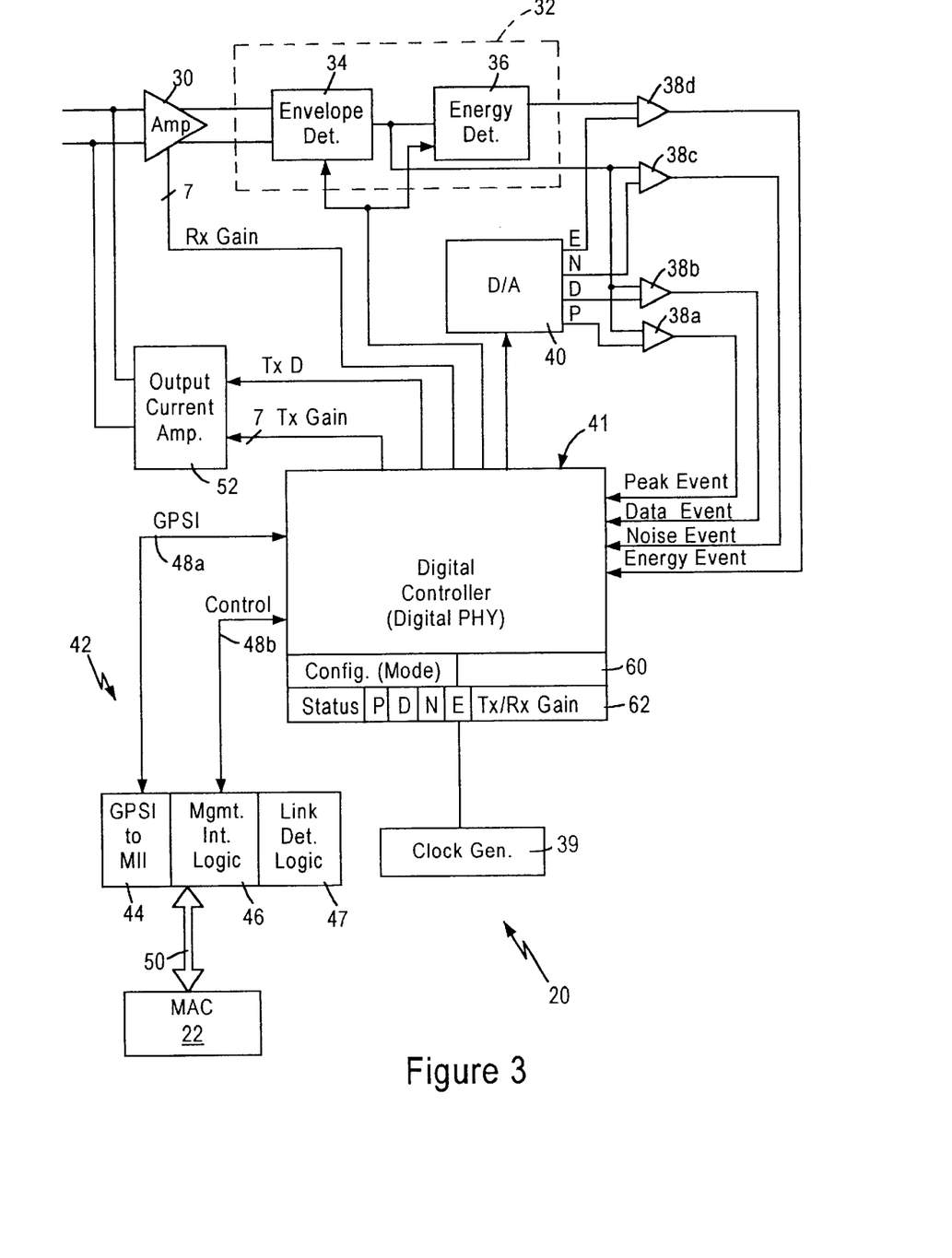
FIG. 3 is a block diagram illustrating the architecture of the physical layer transceiver of FIG. 1 according to an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network received from the telephone medium, such as the network signals shown in FIG. 2C. As described below, the input amplifier 30 has a variable gain controlled by a 7-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 generates the envelope signal 28 in response to the amplified received signal 26. For example, the envelope detector 34 includes an absolute value circuit (e.g., a rectifier circuit) that generates an absolute value signal 39 of the amplified received signal 26, and a low pass filter coupled to the rectifier circuit for filtering out high-frequency components the rectified signal, resulting in the envelope signal 28. The envelope signal 28 is output from the envelope detector 34 and supplied to the energy detector 36. The energy detector 36 includes an integrator which performs the mathematical process of integration over time to produce a signal proportional to energy of the received pulse signal.

As shown in FIG. 3, physical layer transceiver 20 also includes a plurality of slicer circuits 38, and a digital to analog converter 40 for supplying analog threshold signals to the slicer circuits 38. The physical layer transceiver also includes a digital controller 41 configured for controlling the digital analog converter 40 for outputting the threshold signal E, N, D, P, described below.

In particular, the digital controller 41 is configured for controlling the threshold values applied to the slicers 38*a*, 38*b*, and 38*d* based on the signals supplied by the slicers 38 to the digital controller 41. In particular, slicer circuit 38*a* outputs a peak event signal indicating with respect to time which is based on the clock generator 39, whether the envelope signal 28 exceeds a peak threshold (P) supplied by the digital to analog converter 40 under the control of the digital controller 41. Slicer circuits 38*b* and 38*c* output data event signals and noise event signals indicating with respect to time whether the envelope signal 28 exceeds a data transition threshold (D) and a noise threshold (N) respectively. The slicer circuit 38*d* outputs an energy event signal indicating with respect to time whether the energy signal output by energy detector 36 exceeds an energy threshold (E) supplied by the D/A converter 40.

Hence, the slicer circuits 38*a*, 38*b*, and 38*c* output peak, data transition, and noise event signals indicating with respect to time whether the envelope signal 28 exceeds a peak threshold (P), a data transition threshold (D), and a noise threshold (N), respectively. Slicer 38*d*, however, outputs an energy event signal indicating with respect to time whether the energy signal from the energy detector 36 exceeds an energy threshold (E).

The digital controller 41 controls the noise, peak and data transition thresholds based on the noise event signals and the peak signals output by the slicers 38*c* and 38*a*, respectively, and outputs digital data signals to the media access controller 22 via a media independent interface (MII) 50 based on either the energy event signals or the data event signals.

In particular, the digital controller 41 adjusts the gain of the amplifier 30, and the threshold values P, D, N, and E generated by the D to A converter 40 during an access ID (AID) interval. AID is a specific identifier which is unique for each network station 12. AID is a series of 8 pulses output from the PHY transceiver 20 of the transmitting station onto the telephone medium 14, where the time intervals between the first pulse and the successive 7 pulses define respective values. For example, assume a second pulse is output by the PHY transceiver 20 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values used in time intervals T2, T3, T4, T5, and T7. Hence, the presence of the valid AID can be determined by detecting a first pulse, and detecting a presence of 7 successive pulses using detection windows each having a duration of 128 clock cycles.

According to the disclosed embodiment, AID replaces the preamble conventionally used in 10 Base-T Ethernet (IEEE 802.3) systems. Hence, the digital controller 41 of the present invention uses the AID interval to selectively tune the input amplifier 30 to one of 128 different gain settings selected by the RxGain signal, and set the threshold values used by the slicer circuits 38 by supplying digital threshold values to the D/A converter 40. Once the digital controller 41 has tuned the input amplifier 30 and the threshold values of the slicer circuits 38, the digital controller 41 uses either the data transition event signals from the slicer circuit 38*b* or the energy event signal from the slicer circuit 38*d* for recovering the data signals, described below.

The physical layer transceiver also includes a transmitter portion 52 (e.g., an output current amplifier), that converts transmit data (TxD) to an analog network signal. The analog network signal is output at a selected one of 128 output gain values based on the 7-bit transmit gain (TxGain) signal output by the digital controller 41.

As shown in FIG. 3, the physical layer transceiver 20 also includes an output interface 42 including an MII to general purpose serial interface (GPSI) converter 44, management interface logic 46, and buses 48*a* and 48*b*. The bus 48*a* transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48*a*.

The output interface 42 also includes a control data bus 48*b* for transferring configuration data and status information between the digital converter 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38*d* may be supplied by the management agent via the MII 50 and set in the configuration registers 60. The digital controller 41 also includes status registers 62 that include, for example, the threshold values for the threshold signals P, D, and E, and the 7-bit input and output amplifier gain control signals (RxGain, TxGain). Hence, a management agent (e.g., a link controller, described below) can access registers 60 and 62 for reading and writing of control information, and reading status information from the status registers 62.

The interface 42 also includes link detection logic 47 for determining whether a valid link is detected on the network medium 14. In particular, the link detection logic 47 includes a receive state machine that monitors for a prescribed interval (2T) (e.g., 800 milliseconds) the presence of another station's AID based on the expectation that the each physical layer transceiver 20 of a network station 12 transmits an AID as part of a link packet, or a preamble of a data packet, within an interval (T). If after a second prescribed interval (2T) (e.g., 800 ms) the receive state machine in the link detection logic 47 has not detected a valid preamble from the AID detector in the physical layer transceiver 20, then the link status indicator (L1) is set to an invalid condition. The valid preamble detected by the AID detector may be the result of a normal data packet or a link packet having a length less than the minimum length of the data frame. The link detection logic 47 resets the link status indicator (L1) to a valid condition upon detecting three successive valid AIDs from the telephone network medium 14.

Automatic Physical Layer Port Scanning

Figure 4:
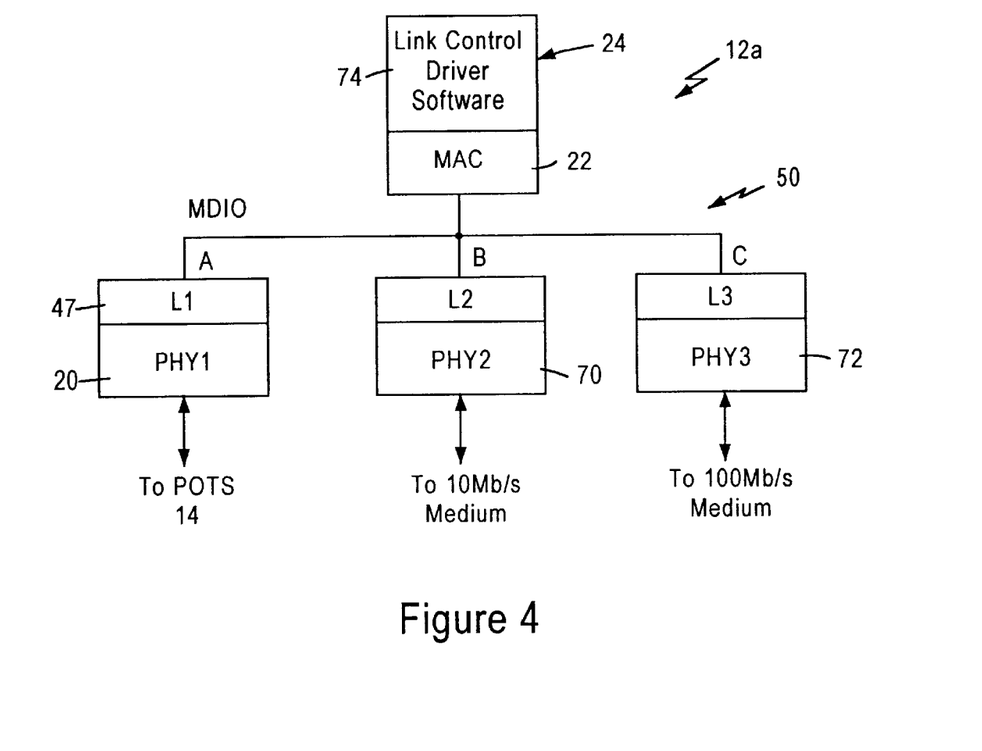
FIG. 4 is a block diagram illustrating in detail the arrangement for selecting one of multiple physical layer ports sharing a shared media independent interface according to an embodiment of the present invention.

FIG. 4 is a diagram illustrating in detail the multiple ports network station 12a configured for selecting a physical layer transceiver for network communication according an embodiment of the present invention. As described above, physical layer transceiver 20 includes link detection logic 47 having a register (L1) for indicating whether the link to the home network 10 is active via the twisted pair wiring 14. The physical layer transceivers 70 and 72 are configured for determining the presence of an active link according to respective network protocols, for example 10 BASE-T and 100 BASE-T, respectively. For example, the physical layers transceiver 70 may generate a link test, where a link test pulse is periodically sent every 16 milliseconds. If the physical layer transceiver 70 does not see either packet data or a link test pulse within a defined time window, for example 50–150 milliseconds, the transceiver 70 will enter a link fail condition, and update its link status register (L2) with a zero bit, indicating the link is not valid. Similarly, the physical layer transceiver 72 may detect the presence of a valid link using auto negotiation, etc. and update its link status register (L3) accordingly. Other schemes for detecting the presence of a link are recognized in the art.

According to the disclosed embodiment, the link control driver software 74, executable by the host processor 24, accesses the link status values L1, L2, and L3 from the respective physical layer transceivers 20, 70, and 72 via the media independent interface 50. In particular, each physical layer transceiver has a unique address, where PHY1 20 has an address A, PHY2 70 has an address B, and PHY3 72 has an address C. The link controller 74 generates a management frame on the media independent interface 50 via the management data input output (MDIO) signal path, and fetches the link status from each of the physical layer transceivers. The link control driver 74 then selects the physical layer transceiver having an active link status and having the maximum data rate.

Hence, the link controller 74, upon initialization of the network (e.g., upon turning on or reset), selects the physical layer transceiver having an active link status and having a maximum data rate, and configures the internal network configuration driver software based on the selected network port. Hence, a physical layer transceiver can be automatically selected by the operating system 24.

Figure 5:
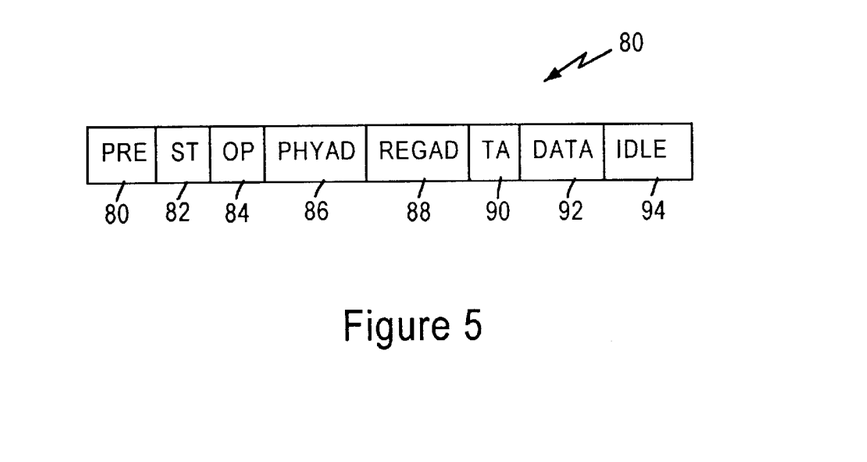
FIG. 5 is a diagram illustration a management frame transmitted between the media access controller and the physical layer transceivers of FIG. 4.

FIG. 5 is a diagram illustrating a management frame structure according to a media independent interface management protocol. The management data is written and read using a defined frame format, passed serially over the MDIO line, synchronous to a management data clock (MDC). The management frame includes a preamble sequence (PRE) 80 of 32 consecutive ones during 32 consecutive clock cycles on the MDC path, allowing the physical layer transceivers 20, 70 and 72 to be synchronized to the new frame. The management frame 80 also includes a start delimiter (ST) 82, where a "01" transition indicates the start of the management frame 80 and ensures that the MDIO line can be driven both high and low. The management frame 80 also includes an operation code (OP) 84, where a "01" indicates a write operation, and a "10" indicates a read operation. The management agent (e.g., link controller 74) supplies a 5-bit address unique to each physical layer transceiver as a PHY address (PHYAD) in field 86. Hence, the PHYAD field 86 enables the link controller 74 to individually address each of the physical layer transceivers 20, 70 and 72. The register address field "REGAD" 88 is a five-bit address which selects the internal management register within the specified PHY transceiver that is to be addressed. Hence, the link controller 74 access the link status from the physical layer transceiver 20 by providing the transceiver address in field 86, and the register address in field 88. The management frame 80 also includes a turnaround field (TA) 90.

In response to read frame, the physical layer transceiver 20 output the management frame by outputting the contents of the addressed register (L1) in the data field 92. The data field 92 is a 16 bit data field containing the value to be written or read from the specified register address of addressed the PHY. The idle field 94 is used between management frames by both the link controller 74 and the physical transceivers to place their output drivers in the high impedance state.

According to the disclosed embodiment, a link controller 74 is configured for selecting a physical layer transceiver port for transmission of network data to and from the MAC 22. Hence, the link controller 74 can automatically determine a link status for each of the physical layer transceivers, and automatically select one of the physical layer transceivers for network communication based on the corresponding link status and the relative speed of the transceiver.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network station of establishing a connection to a network, comprising:

connecting a plurality of physical layer transceivers to physical layer media having respective media protocols, each physical layer transceiver having a corresponding physical layer address, at least one of the physical layer transceivers configured for transmitting and receiving network signals via a telephone line medium;

determining in each of the physical layer transceivers a link status for the corresponding network medium;

accessing the link status for the respective physical layer transceivers via a shared media independent interface providing communications between the physical layer transceivers and the network station; and automatically selecting one of the physical layer transceivers based on the corresponding link status for communication on the corresponding network medium.

2. The method of claim 1, wherein the selecting step comprises selecting the one physical layer transceiver having an active link status and having a maximum data rate.

3. The method of claim 1, wherein the one physical layer transceiver determines a presence of a network based on a determined presence of access identifier (AID) pulses on the telephone line medium at prescribed time intervals.

4. The method of claim 1, wherein the accessing step comprises:

sending a read command onto a management data input output (MDIO) signal path of the media independent interface, the read command specifying the physical layer address for one of the physical layer transceivers and a link status register address; and fetching the link status from the corresponding one physical layer transceiver via the MDIO signal path following the sending step.

5. The method of claim 1, wherein the telephone line medium is twisted pair telephone wiring.

6. A network station configured for communication on a network, comprising:

a plurality of physical layer transceivers configured for determining the link status on respective network media, at least one of the network media being a telephone line medium;

a media access controller configured for obtaining the link status for the respective physical layer transceivers via a shared media independent interface; and a controller for automatically selecting one of the physical layer transceivers for network communication based on the obtained link status for the respective network media.

7. The network station of claim 6, wherein the physical layer transceivers include a first physical layer transceiver configured for determining the link status of the telephone line medium based on detection of valid access ID (AID) pulses within a prescribed detection interval.

8. The network station of claim 7, wherein each physical layer transceiver includes a link status register, the controller selectively addressing each of the link status registers of the physical layer transceivers to obtain the corresponding link status.

9. The network station of claim 8, wherein the controller is communication driver software executable by a host processor in the network station.

10. The network station of claim 6, wherein the telephone line medium is twisted pair telephone wiring.

* * * * *